United States Patent [19]

Heule

[11] 4,165,201

[45] Aug. 21, 1979

[54] DEBURRING TOOL FOR DEBURRING BORES

[76] Inventor: Peter Heule, Grünenstein, Balgach, Switzerland

[21] Appl. No.: 736,101

[22] Filed: Oct. 27, 1976

[30] Foreign Application Priority Data

Oct. 28, 1975 [DE] Fed. Rep. of Germany ....... 2548214

[51] Int. Cl.² ............................................ B23D 77/00
[52] U.S. Cl. .................................... 408/187; 408/227
[58] Field of Search ...................... 408/3, 12, 13, 111, 408/199, 227, 231, 112, 187, 113

[56] References Cited

U.S. PATENT DOCUMENTS

2,487,638   11/1949   Danielson ....................... 408/187 X

Primary Examiner—Donald R. Schran
Assistant Examiner—W. D. Bray
Attorney, Agent, or Firm—Price and Caslin

[57] ABSTRACT

This invention teaches a deburring tool comprising a tool holder with a plurality of knives having cutting edges capable of contact on a bore edge by advancing in a longitudinal direction of the tool holder, characterized in that the reaction force acting against the advancing force on one or more of the knives serves for the automatic control of the longitudinal displacement of the remaining knives.

15 Claims, 10 Drawing Figures

DEBURRING TOOL FOR DEBURRING BORES

BACKGROUND OF INVENTION

This invention relates to a deburring tool for deburring of bores formed from a tool holder with at least two knives, the cutting edges of which are capable to being brought at least partially in contact with an edge of the bore by feeding the tool holder in a longitudinal direction. The purpose of the invention is the provision of a deburring tool for the deburring of bores, the edge of the bore or surroundings of which represents any desired curved face. The deburring tool according to the invention can also be used for deburring of the bores in a straight face.

Up until now there have been no machine tools known for deburring a bore in a cylindrical casing. Such a bore is characterized in that the edge of the bore hole is curved spherically. If a prior known cross head or sinker were positioned on the bore in the spherically curved face, then only the burr of the bore hole is removed on the two highest opposite points of the face. The other faces lying deeper thereunder remain unworked and the burrs remain there.

It has hitherto been proposed to deburr the spherically curved faces manually by filing. Another known arrangement is where a sinker that is standard in the trade is rotated by hand in a tumbler movement, and also the deepest places of the bore hole burr are operated on by the cutting edges of the sinker.

The object of the present invention is to design a manually driven or machine driven deburring tool of the above-mentioned type which can be placed at right angles to the plane of the bore hole, and the removal of material on the edge of the bore hole, that is known as deburring, takes place uniformly over the whole periphery. An additional object of the present invention is to provide a tool that is capable of being used for the deburring of bores in any desired curved faces, such as convex, concave, any desired corrugation or straight.

The deburring tool according to the invention described in the following specification is also capable of being used for the deburring of noncircular bores of oval, slotted or interrupted type.

STATEMENT OF INVENTION

The problem of the prior art is solved by a deburring tool of the above mentioned type which is characterized in that several knives are movable longitudinally in the direction of movement of the tool holder, and the force acting against the resistance of one or more of the knives serves for the automatic control of the longitudinal displacement of the remaining knives.

An essential feature of the present invention is the longitudinal displacement of the knives acting in the direction of movement of the tool holder, so that one or more knives control the advancing movements of the other remaining knives. It is essential according to the present invention that the advancing movement of the knives is controlled from the upper surface contour of the edge of the bore hole. Connected to the knife, or in a second embodiment separate from the knife, is arranged a sensing face which senses the edge of the bore hole of the bore to be deburred. Depending on the advancing movement or sensing movement of the sensing face, the advance of the knives is controlled corresponding to the contour of the edge of the bore hole.

In a first embodiment of the invention, the sensing face is arranged on the knife itself. This sensing face connects with the cutting edge for deburring of the bore and senses the edge of the bore hole. The deburring tool has, on its top side opposite the knives, a tool holding spindle which may be held in a drill chuck of a drilling machine or in a clamping chuck of a lathe. If the deburring tool is now advanced in a longitudinal direction in the bore to be deburred, then the tool is first centered in the bore by the knife blades projecting from the cutting end of the deburring tool. The cutting edge intended for the deburring of the bore is formed either as a radius or as a tapered surface. If now a desired cutting edge of the knife is placed on the periphery of the bore hole then a reaction force acting in the opposite direction to the direction of movement acts on the knife and tends to press this knife back into the tool holder of this deburring tool. This reaction force is used to control the advance of the remaining knives so that the remaining knives with their cutting edges and their sensing faces are seated on the edge of the bore hole.

A first embodiment of the present invention provides for each of the knives to engage with a hinge point of a parallelogram formed by rocking levers and hinged bearings. Each hinge point of the parallelogram is either pivoted in the direction of advance or in the opposite direction thereto as that of the remaining knives which likewise engage the hinge points of the parallelogram carry out corresponding pivoting movements with the same force. If for example four knives are provided of which each one engages with a hinge point of a parallelogram, then the knife lying opposite on one diagonal carries out a parallel movement with the same force, while the two knives carried on the opposite diagonal carry out opposite movements with likewise the same force. If a bore is to be deburred in a cylindrical casing, then there is a point on the edge of the bore hole in which the knives lying opposite on one diagonal are located on the highest point of the end of the bore hole. The sensing of this highest point presses the knives seated thereon back into their smallest advance position in the tool holder so that at the same time this displacement movement is used to bring the knives lying opposite on the opposite diagonal into their greatest extended position in the tool holder so that these knives are located on the lowest place of the edge of the bore hole and likewise remove the burr of the bore hole therein.

A second embodiment of the present invention provides that only two knives are present so that these two knives must engage on a diagonal of the parallelogram, and the other knives in the adjacent diagonals can be omitted.

A further embodiment of the present invention provides for a sensing face which senses the edge of the bore hole to be arranged separate from the knives in the tool holder. A sensor must be associated with each cutting knife. The sensing face thus may be designed as sensors located resiliently to bear on the edge of the bore hole, the advance and return movement of which sensors act hydraulically through levers or pneumatically on the corresponding advancing and return movements of the automatically controlled knives.

A further embodiment of the present invention provides for the mutual automatic control of the knives to be formed so that the advancing and return movements of the knives is transmitted through toothed racks and pinions to the remaining knives.

Another embodiment of the present invention provides for the advancing and return movements of the sensors and the sensing face connected to the knives by means of a piston rod of a pressure medium cylinder, and a pressure medium is associated with each knife. The pressure medium pipes of such a deburring tool are then so closely coordinated that the pressure medium cylinder lying opposite on one diagonal will carry out parallel movements whilst the pressure medium cylinders lying on the other diagonal will carry out opposite movements.

It is essential with the present invention therefore that the knives for the deburring of the bore hole are arranged in the tool holder to be longitudinally movable in the direction of advance of the tool holder, and the force acting in opposition on one or more of the knives through sensors or sensing faces serves for the automatic control of the longitudinal displacement of the remaining knives.

With this arrangement substantial advantages compared with known deburring tools are obtained. The deburring of bores is carried out as the edge of the bore hole is sensed by sensors or sensing faces, and accordingly the advance of the cutting knives is controlled. Likewise noncircular bores, for example, oval or any other shape are deburred as the cutting edges of the knives act only in a cutting manner when the sensor is located on the edge of the bore hole. Thus interrupted or slit bores, circular segments, can be deburred. The removal of material therefore is uniform on the periphery of the curved bore hole. The tool is adapted to the curved edge of the bore hole. The cutting knives may be mounted resiliently in the tool holder in the direction of advance, as well as mounted resiliently in a radial direction so that the tool automatically is centered in the bore.

DESCRIPTION OF DRAWINGS

The invention will be described with reference to the accompanying drawings wherein.

DESCRIPTION OF PREFERRED EMBODIMENT

Figure 1:
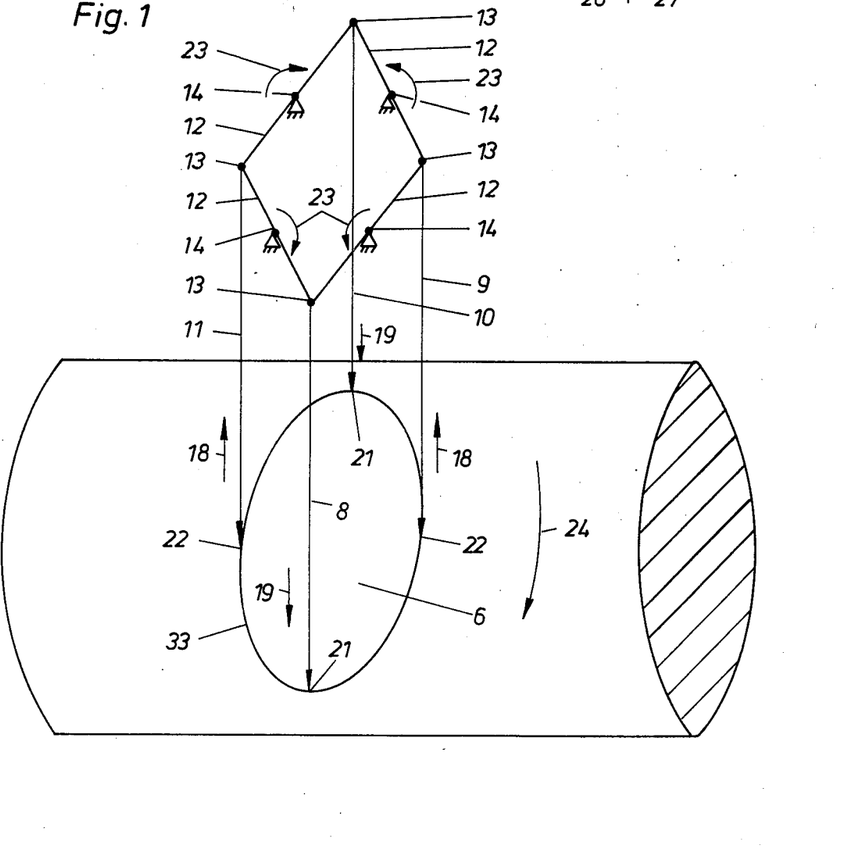
FIG. 1 shows a force diagram of the operating principle of the deburring tool in a first embodiment with a parallelogram made from rocking levers.
Figure 2:
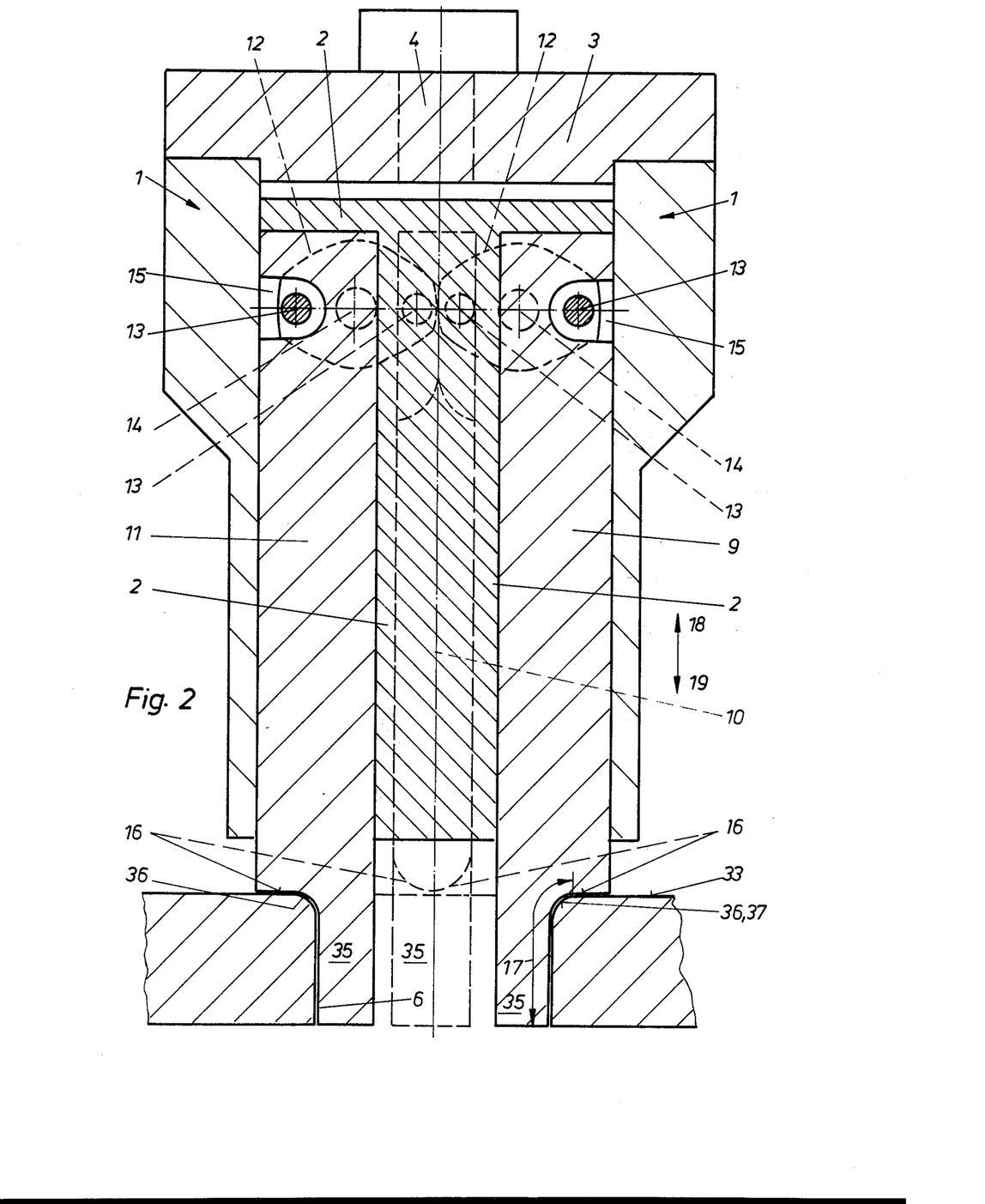
FIG. 2 shows the first embodiment according to the representation in FIG. 1 as a longitudinal cross-section of a deburring tool taken on the line II—II of FIG. 4.

In FIG. 1 there is shown diagrammatically the working principle of a first embodiment of the deburring tool. In a cylindrical casing a bore 6 is made with a bore hole edge 33. On the bore hole edge 33 are placed four cutting knives 8, 9, 10, 11 so that the cutting knives sense, with a sensing face 16, the bore hole edge 33 as is seen in FIG. 2. The deburring tool thus rotates clockwise in the direction of rotation 24.

In the position shown the opposite knives 9, 11 engage the points 22 as the highest position on the bore hole edge 33, while the two remaining knives 8, 10 engage the points 21 as the lowest positions. During the movement of rotation in the direction of rotation 24, the knives 9, 11 are pressed back in the direction upward 18 against the direction of advance in the downward direction of the tool holder 1, while at the same time the two remaining knives 8, 10 are advanced through the present lever mechanism in the direction 19 to advance toward the bore hole edge 33.

The knives 8, 9, 10, 11 have slots or recesses 15 that are joined to the hinge pins 13 of a parallelogram to be rotatably mounted from rocking levers 12 through hinged bearings 14 in the tool holder 1. The adjacent rocking levers 12 are pivotally connected to one another through pivot pins 13 and recesses 15. In FIG. 1, it is shown diagrammatically that the rocking levers 12 are mounted on hinged bearings 14 of the tool holder 1.

If now the knives 9, 11 on reaching the highest position 22 of the edge of the bore hole are pressed back in the direction 18, in the tool holder then the hinge pins 13 at the connecting recesses 15 of the knives 9, 11 with the parallelogram is pressed up in the direction 18. The tilting levers 12 pivot about the bearing bolts 14 in the direction of rotation 23. The knives 8, 10 engage the opposite face end of the rocking levers 12 and carry out an advancing movement in the downward direction 19 and are thus moved to the lowest points 21 on the bore hole edge 33. With the diagrammatically shown mechanism it is therefore seen that the force reacting against the downward direction of advance serves for the automatic control of the remaining knives in the downward direction 19. On the contrary however the knives 8, 10 control the advance of the other knives 9, 11.

From the force diagram in FIG. 1, it is clear that the automatic control of the knives 8, 9, 10, 11 by sensing of the bore hole edge 33 even function when, instead of four knives, only three or two are present and it therefore is essential that the parallelogram must remain upright. The knives 9, 11 may however, for example be omitted without the operating efficiency of the deburring tool being adversely affected.

In FIGS. 1 to 7 a first embodiment of the present invention is shown in detail. FIG. 2 shows a longitudinal section on line II—II through the deburring tool shown in FIG. 4.

A cylindrical sleeve serves as a tool holder 1 which sleeve is provided on its upper side with a lid 3 on which a tool receiver 4 is provided.

This tool receiver 4 may (for example) be a spindle which is clamped in a drill chuck of a drilling machine or lathe. In the tool holder 1 is arranged a guide member 2 which is shown in plan view sectioned in FIG. 4. By comparing FIG. 2 and FIG. 4 the arrangement of the knives and the associated rocking levers 12 can be seen. In the guide member 2 are provided guide paths 32 (see FIG. 4) in which the knives are movably arraged in the directions 18, 19. The knives 8, 10 and 9, 11 lie opposite one another. Each of the knives has a recess 15 in which are received two hinge pins 13 (see FIG. 4). The rocking levers 12 thus are rotatably mounted through hinged bearings 14 in the tool holder 1.

FIG. 2 shows in cross-section two knives 9, 11 lying opposite each other, and in dotted lines the knife 10 lying behind the guide member 2.

Figure 4:
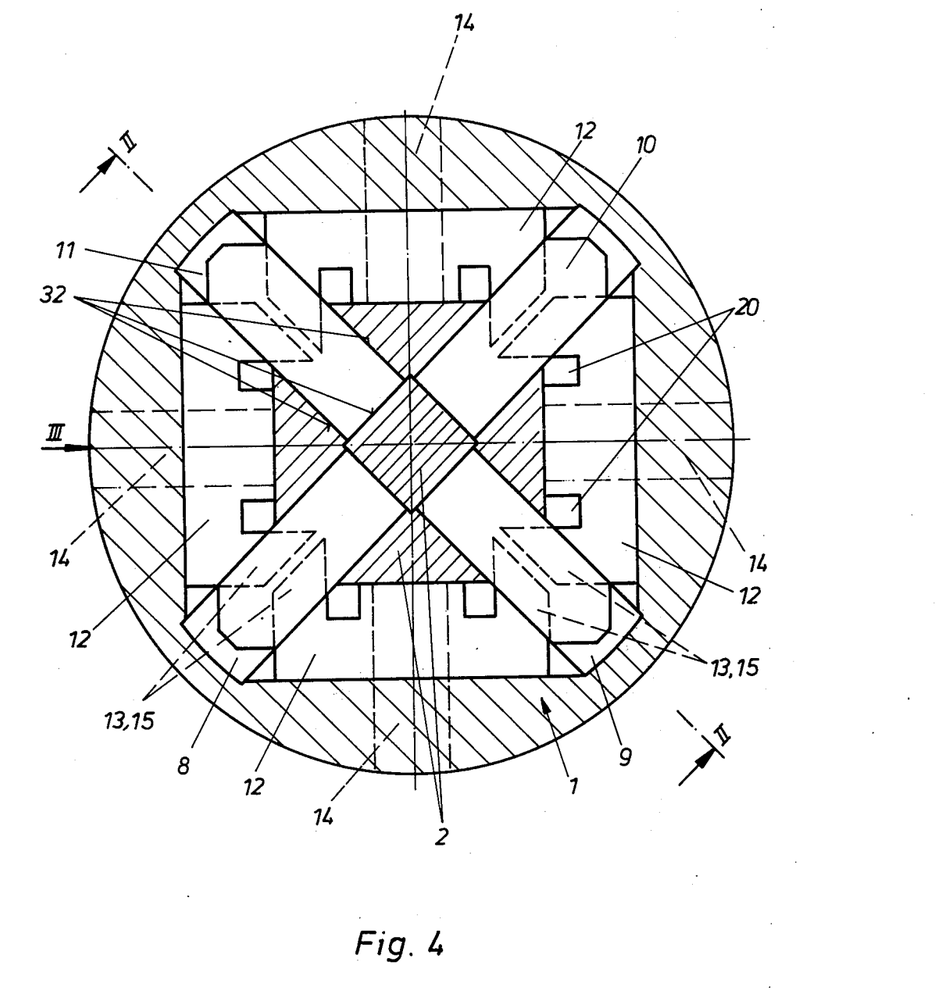
FIG. 4 shows a top plan view of the parallelogram of the deburring tool with the lid 3 removed and a tool holder 1 in cross-section, with a deburring tool according to FIGS. 1 to 3.

The rocking levers 12 have on their edge contacting the knives 8, 9, 10, 11 a recess 20, as is seen in FIG. 4, which allows the rocking levers 12 to move past the knives. FIG. 2 shows a deburring tool according to the present invention engaged in deburring a bore 6. The knives thus are formed within a blade 35 which is provided with a length 17 of a cutting edge. It is essential in this embodiment that the cutting edge cuts the inner bore hole wall as well as also a radius 37 which serves for removal of the bore hole burr 36.

As shown in FIG. 2 the knives 9, 10, 11 are each provided with a sensing face 16 that is located on the bore hole edge 33. According to the advancing force in the downward direction 19 of the tool holder 4 the knives 9, 11 are, for example, resisted or pushed back in the direction 18 into the tool holder 1 and move the hinge pins 13 located in the recess 15 in the upward direction 18. The hinge pins 13 located on the other end of the rocking levers 12 are displaced in the downward direction 19 and press the knife 10 and the knife 8 (not visible) downwards so that the sensing face 16 of knives 8 and 10 are likewise seated on the lower lying bore hole edge at points 21. It is therefore essential that the sensing faces 16 of the knives 8, 9, 10 and 11 are always located on any shaped bore hole edge 33 and thus sense the contour of the bore hole edge 33.

Figure 3:
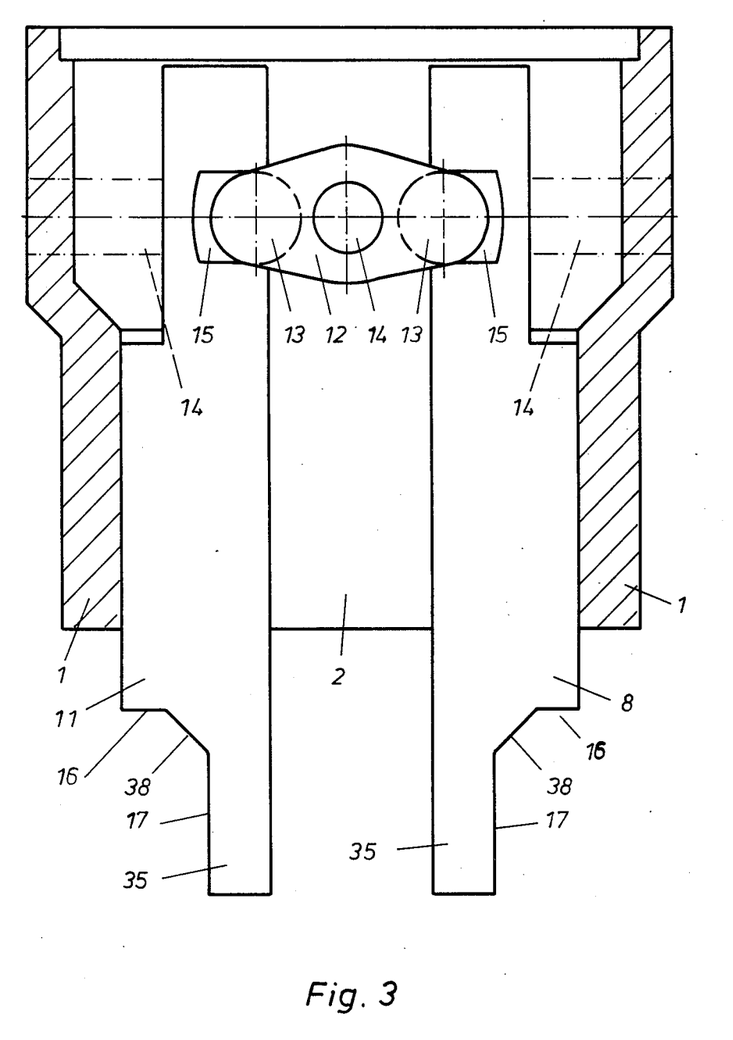
FIG. 3 shows an elevational view looking in the direction of the arrow III in FIG. 4 with the lid 3 removed and the tool holder 1 is shown in cross-section, with a second modification of knife cutting edge.

FIG. 3 is a view in the direction of the arrow III in FIG. 4. As a modification of the knives 8, 9, 10 and 11 shown in FIGS. 2 and 4, the radius 37 of the cutting edge 17 has been replaced by a tapered surface 38 for the removal of the bore hole burr 36. The knives 8, 9, 10, 11 project radially outwards from the guide member 2 and have a recess 15 receiving respectively two hinge pins 13 of two rocking levers 12. Hence, the rocking levers 12 are disposed between the inner wall of the tool holder 1 and the outer wall of the guide sleeve 2 which results in a space saving and compact construction.

Figure 5:
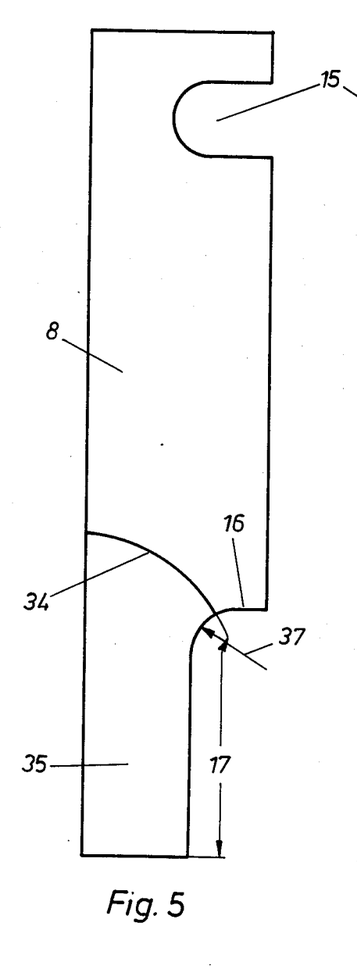
FIG. 5 is an elevational view of a third modification of a knife.
Figure 6:
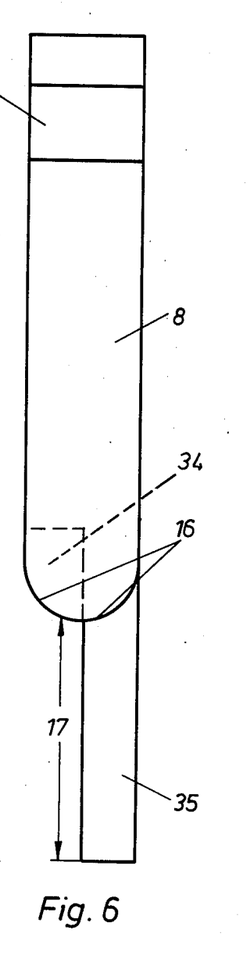
FIG. 6 is a right side view of the knife that is shown in FIG. 5.

In FIGS. 5 and 6, a cutting knife 8 is shown detached from the tool holder. The cutting knife 8 has in its upper part a recess 15 for receiving two hinge pins 13 of two rocking levers 12. The lower part of the knife 8 is formed by a blade 35 on the front side of which is formed a cutting edge having a length 17.

It is thus essential that the cutting edge 17 is formed as a straight edge as well as also having a radius 37 or a tapered surface 38 with which the bore hole burr 36 is removable. The sensing face 16 is jointed to the radius 37 or tapered surface 38 and is seated on the bore hole 33. The sensing face 16 may thus be formed rounded corresponding to the representation of FIG. 6 in order to avoid a rubbing action between the knife 8 and the bore hole edge 33. Just as satisfactory in another embodiment of the present invention, the sensing face 16 can also be replaced by a resiliently mounted ball, roll or roller (not shown) that may be rotatably disposed on the knife 8 and functions as a sensing face 16.

Figure 7:
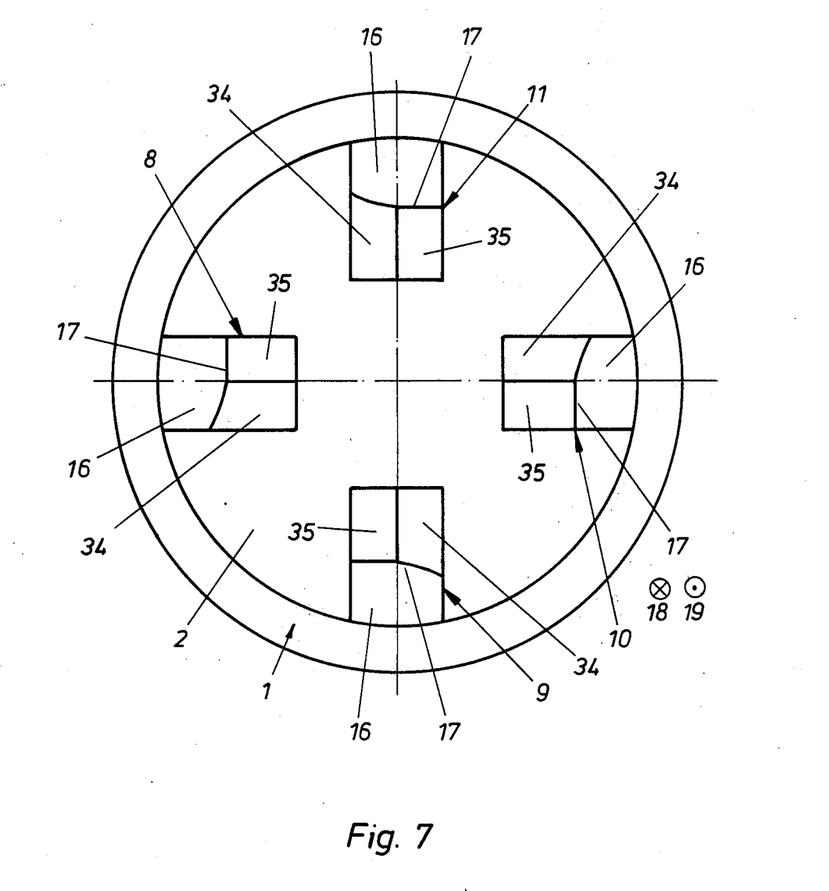
FIG. 7 is a bottom plan view of the cutting knives and cutting edges of a deburring tool according to the knife design of FIGS. 5 and 6.

The knife 8 shown separately in FIGS. 5 and 6 may also be divisible into separable parts. The divisibility of the knife has the advantage that the rocking lever mechanism 12 does not have to be removed from the tool holder 1 for replacement of a knife. Only the blade 35 with the cutting edge length 17, must be removed whereby the upper part of the knife with respect 15 remains in engagement with the hinge pins 13. In FIGS. 5, 6, and 7 it is also shown that above the cutting edge length 17 there is disposed a cut out 34 which permits a subsequent machining of the cutting edge length 17.

In FIG. 7 is shown the bottom plan view of the lower front side of the deburring tool turned towards the bore hole edge 33. The cutting edges 17 of the knives 8, 9, and 10, 11 thus form a mutual angle of 90°.

Figure 8:
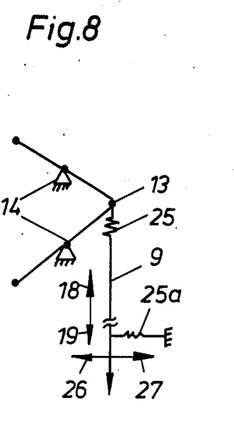
FIG. 8 is a diagrammatic detail view of a second embodiment of a deburring tool compared with the representation of FIG. 1.

In FIG. 8 is shown diagrammatically as a schematic diagram a further embodiment of the present invention compared with FIG. 1. From the representation it can be seen that the knives 8, 9, 10, 11 with the aid of springs 25 can be mounted resiliently in the tool holder 1 in the two directions 18, 19. This resilient bearing arrangement has the essential advantage that the knives can follow rapidly any variation of the contour of the bore hole edge 33. In the lower part of FIG. 8, it is also shown that the knives 8, 9, 10, 11 may also be adjustable in a radial direction. Additionally the knives may be mounted resiliently in directions 26, 27 also with the aid of springs 25a in the tool holder 1. The feature of the adjustability in the directions 26, 27 has the advantage that the deburring tool according to the invention is adaptable to any desired bore hole diameters.

Figure 9:
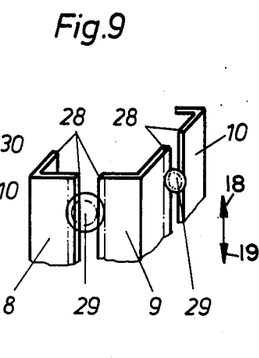
FIG. 9 is a diagrammatic detail representation of a third embodiment compared with FIG. 1.

FIG. 9 shows a further embodiment of deblurring tool. As hereinbefore explained, it is not limited to one means how the advancing movement of some knives which are seated with sensing faces or separate sensors on the bore hole edge 33 is transmitted to the remaining knives. It is important with the arrangement of four knives which lie opposite on diagonals, the knives lying opposite on one diagonal carry out a similar parallel movement, whilst the knives lying on the other diagonal carry out oppositely directed movements with the same force. In FIG. 9 it is shown that the automatic control of the knives also is solved with toothed racks 28 and pinions 29. Each knife 8, 9, 10, 11 thus forms two toothed racks 28 at an angle to one another, each of which meshes with a pinion 29 rotatably mounted on the tool holder 1. If, for example, the knife 9 moves upwards in the direction 18 then the two pinions 29 meshing with the toothed racks 28 rotate and thereby press, by engaging in the toothed racks 28. These knives 8, 10 have on their other side other toothed racks 28 which cooperate with pinions 29 (not shown).

Figure 10:
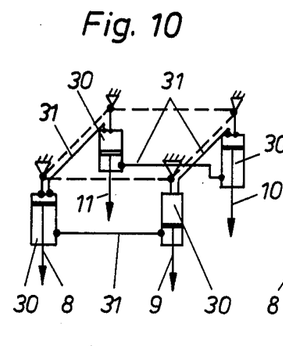
FIG. 10 is a diagrammatic detail representation of a fourth embodiment compared to FIG. 1.

A further embodiment of the present invention is shown in the force diagram of FIG. 10. It can be seen that the knives 8, 9, 10, 11 are formed as piston rods working in hydraulic cylinders 30. The pressure means pipes 31 of the hydraulic cylinders 30 are so connected to one another that the piston rods of the hydraulic cylinders 30 lying opposite to one another on one diagonal carry out parallel movement with the same force, while the piston rods lying on the other diagonals carry out opposite movements with the same force. With this arrangement also a mutual automatic control of the knives 8, 9, 10, 11 is possible.

In the present invention the deburring tool according to the invention is capable of use also for the deburring of oval or other nonround or slit bores. Instead of the use of four knives, as shown for example in FIG. 1, odd number of knives may be used. For that it is necessary for the lever ratio of the rocking levers 12 to be no longer symmetrical, but asymmetrical.

I claim:

1. A deburring tool for deburring work pieces having bores, the tool comprising in combination:
   a tool holder,
   a plurality of knives being mounted in the tool holder for longitudinal movement therein,
the tool characterized by:
   each knife having sensing means which senses the edge of the bore hole and a cutting edge adapted for entering the bore;
   interconnecting means joining all of the knives whereby the opposite knives act in unison with each other in longitudinal movement within the toolholder and opposite the action of the adjacent knives,
   the sensing means of at least one knife adapted to engage the edge of the bore hole and automatically control the position of the remaining knives by action of the interconnecting means.

2. The deburring tool, according to claim 1, further characterized in that each of the knives engages the said interconnecting means which comprises hinge pins of a parallelogram formed from rocking levers and hinged bearings.

3. The deburring tool as recited in claim 2, further characterized in that the said parallelogram of the interconnecting means comprises four rocking levers, and each lever is arranged pivotally on the tool holder adjacent the center thereof, on the free ends of each lever are fixed hinge pins respectively, each knife being provided with a recess for receiving a pair of hinge pins from the adjacent rocking levers.

4. The deburring tool according to claim 1 further characterized in that the tool holder is formed as a guide sleeve in which is fixed centrally a guide member with guide paths for the longitudinal guiding of the knives with the tool holder.

5. A deburring tool according to claim 1 further characterized in that the knives are arranged at an angle of substantially 90° to one another.

6. A deburring tool according to claim 4 further characterized in that the knives project from the central guide member radially outward, and each knife has a recess for receiving two hinge pins of two adjacent rocking levers of the said interconnecting means whereby the rocking levers are arranged between the inner wall of the tool holder and the outer wall of the guide member.

7. A deburring tool according to claim 3 further characterized in that the rocking levers are mounted pivotably on hinged bearings fixed in the tool holder.

8. A deburring tool according to claim 1, further characterized in that each knife is formed with a blade having a vertical cutting edge as well as an outwardly tapered portion adjacent its upper end.

9. A deburring tool according to claim 1 further characterized in that each knife has two toothed racks at an angle to one another each of which meshes with a pinion rotatably arranged on the tool holder and the rotation of the pinion is transmitted to the toothed rack of the adjacent knife.

10. A deburring tool according to claim 1 further characterized in that each knife forms the piston rod of a hydraulic cylinder which is connected to the tool holder, and the hydraulic cylinders are connected in such a manner by means of pressure medium pipes that the piston rods are moved by diagonally opposite hydraulic cylinders in one direction while the piston rods of the hydraulic cylinders on the other diagonals are displaced in the opposite direction.

11. A deburring tool according to claim 9 further characterized in that the knives are resiliently biased in their direction of advance.

12. A deburring tool according to claim 11 further characterized in that the knives are adjustable in a radial direction.

13. A deburring tool according to claim 1 further characterized in that the blades are replaceable.

14. A deburring tool according to claim 13 further characterized in that the knives are adapted for the deburring of oval or other nonround bores.

15. A deburring tool according to claim 14 further characterized in that the sensing faces are seated resiliently on the bore hole edge.

* * * * *